3,052,624
HYDROCARBON CONVERSION
REACTOR COOLING
Vernon P. Kush, Casper, Wyo., assignor to Socony Mobil
Oil Company, Inc., a corporation of New York
Filed Mar. 24, 1958, Ser. No. 723,584
1 Claim. (Cl. 208—48)

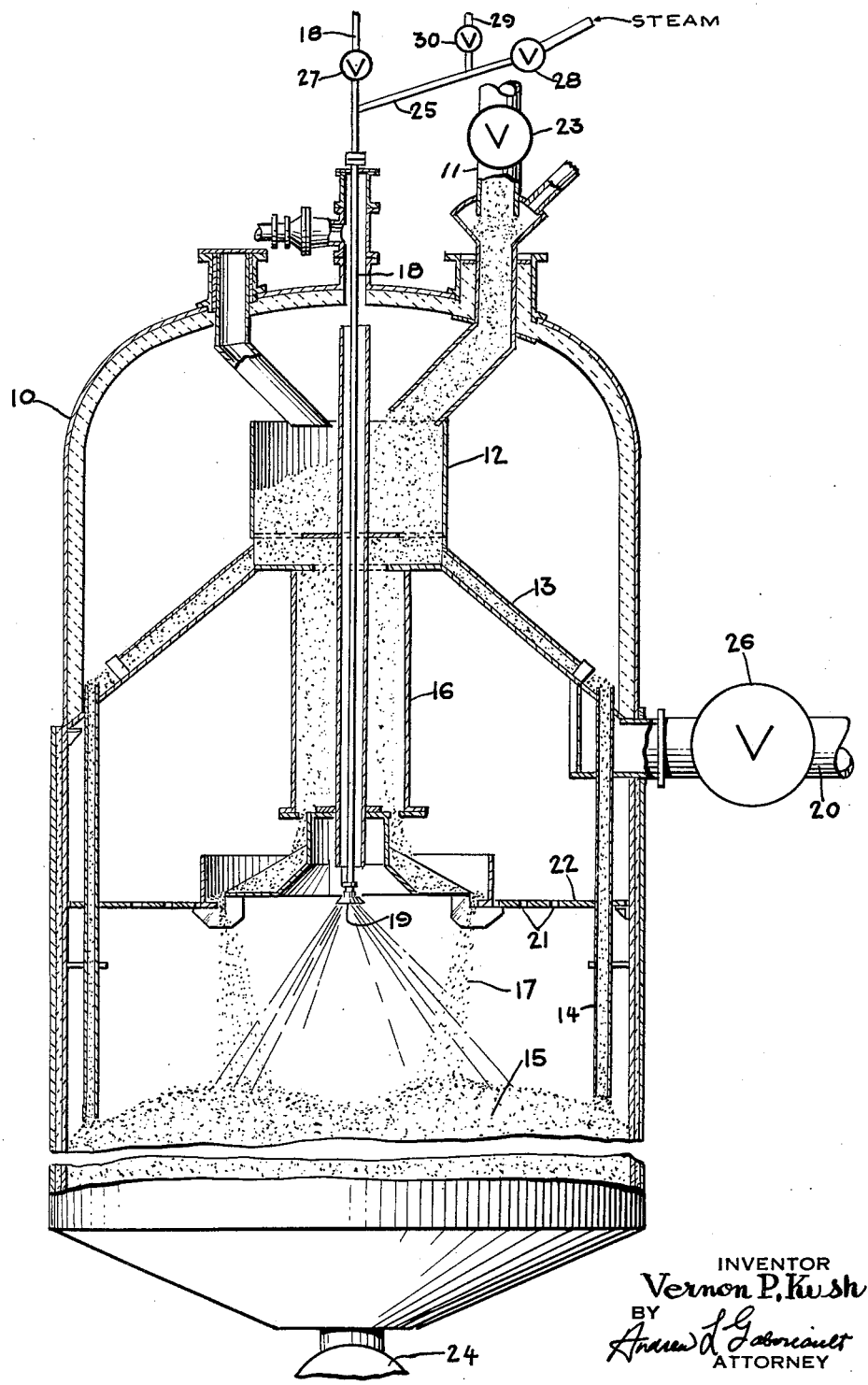

This invention is concerned with a technique for cooling hydrocarbon conversion reactors rapidly while avoiding undue stress in the metal walls of the reactor chamber. It is particularly concerned with a cooling technique which facilitates the removal of coke accumulations from the reactor walls.

Typical of processes to which this invention may be applied is the catalytic conversion of high boiling hydrocarbons to lower boiling hydrocarbons by passing the hydrocarbon charge downwardly through a downwardly gravitating, substantially compact bed of granular catalytic material at a temperature of the order of 850° F. and up. Other processes to which this technique may be applied are the thermal cracking, coking or visbreaking of hydrocarbon charge by contacting the charge with a heated inert contact material and the catalytic reforming, hydrocracking, desulfurization, isomerization and the like of hydrocarbons in the presence of a granular catalyst.

Conversion reactors in the aforementioned processes must periodically be shut down in order that the reactor may be cleaned of carbonaceous material which has accumulated on the walls thereof. The periods during which the reactor is shut down are, of course, periods when no revenue is being realized from the operation. Therefore, the shorter the shutdown period the more economical is the over-all operation.

These reactors exist at temperatures generally around 900° F., and a considerable period of time may be expended in cooling the reactor to ambient temperatures so that men may enter the reactor and inspect it and make any necessary repairs. It is usually necessary, during this shutdown period, to chip from the various walls of the reactor accumulations of carbonaceous materials or coke thereon since, if this coke is allowed to build up, it may break off of its own weight in large chunks which plug up restricted passages in the lower section of the reactor.

Any technique for cooling the reactor rapidly must, however, not be such as to set up undesirable stresses in the metal walls of the reactor.

There has now been discovered a cooling technique which rapidly brings the reactor to ambient temperatures without setting up stresses in the reactor walls and which acts on the coke accumulations on the walls so as to render them more easily removable.

A major object of this invention is to provide a technique for rapidly cooling hydrocarbon conversion reactors.

Another object of this invention is to provide a technique for improving the ease with which coke accumulations on reactor walls are removed.

These and other objects of the invention will be apparent from the following description of the invention.

Broadly, in this invention, cooling of a hot conversion reactor is effected by first removing from the reactor all granular contact material. Steam is then sprayed into the reactor to reduce its temperature to a temperature within the range 600 to 700° F. When the temperature has been so reduced a mixture of steam and water is sprayed into the reactor to further cool the reactor to a temperature within the range 150 to 250° F. The ratio of steam to water is adjusted during this cooling stage so that the rate of cooling falls within the range 40 to 60° F. per hour. Thereafter water alone is sprayed into the reactor to reduce its temperature to about 75 to 100° F. It has been found that when this cooling technique is followed the reactor is not only brought rapidly to a temperature at which it may be inspected but coke accumulations on the metal walls and other metal parts are more easily removed than with prior art techniques.

This invention will be more clearly understood by referring to the attached drawing. This drawing illustrates a catalytic conversion reactor employing the conventional falling curtain technique for providing liquid feed to the reactor. In its normal operation hot granular catalyst gravitates into the upper section of reactor 10 through passage 11. This catalyst is supplied to a cylindrical receptacle 12, from which part of it spreads outwardly in a frusto-conical stream 13 to supply compact streams which gravitate downwardly through passageways 14 onto the upper surface of reaction bed 15. A major portion of the catalyst feed (usually about 80 percent) gravitates downwardly through passageway 16 and is then baffled outwardly to form a falling shower or curtain of catalyst 17 which falls on the surface of reaction bed 15. A liquid hydrocarbon feed enters through pipe 18 and is sprayed outwardly into shower 17 by means of nozzle 19. A vaporized feed may enter through passageway 20 and pass through perforations 21 in plate 22 and then into the upper end of reaction bed 15.

When this reactor is shut down the hydrocarbon feed is immediately discontinued by closing valves 26 and 27. Valve 23 is also closed to stop further catalyst flow to the reactor. Valve 24 is allowed to remain open until all catalyst has flowed out of the reactor. Steam is then supplied to the reactor through conduits 25 and 18 by opening valve 28. This steam issues from the liquid feed nozzle 19. Steaming is continued until the temperature of the reactor has been reduced to a temperature within the range 600 to 700° F., and preferably 600 to 650° F. At this point water is added to the steam coming in through passage 29 by opening valve 30. Normally only a small amount of water will be needed initially and adjustments are made in the water-steam ratio to maintain the rate of cooling of the reactor within the range 40 to 60° F. per hour, preferably about 50° F. per hour. When a temperature within the range 150 to 250° F., preferably about 200° F., is reached, steam supply is cut off by closing valve 28 and water alone is used to cool the temperature down to 75 to 100° F., at which point the operation is complete.

The foregoing cooling process has been used in commercial operations, and it was found that coke accumulation on the reactor walls were easier to remove when using this procedure as compared with prior art slower cooling processes.

The temperature and rates of cooling specified above are the temperatures and rates measured from the level in the reactor on which the upper surface of the reaction bed lies in normal operation to the level of the reaction bed bottom.

The foregoing description described injection of water and steam through the liquid feed spray nozzle of the reactor. This, of course, is the most advantageous way to supply the cooling fluids. However, within the broad scope of this invention they may be sprayed into separate injection nozzles. This cooling system will also obviously apply to the other types of hydrocarbon feed devices which are used, such as mixed feed injection systems currently employed in some installations.

*Example*

A Thermofor catalytic cracking reactor for processing 8,000 barrels per day of charge having a diameter of 12 feet, was cooled down using the technique described above. Steam used in the initial step was saturated steam at about 160 pounds per square inch. When the temperature had been reduced to 600–650° F., the steam rate was set at 1,000 pound per hour and a small amount of liquid water added to the steam. This steam-water mixture was at a temperature of about 280° F. and the water rate was varied to maintain a cooling rate of about 50° F. per hour. When the reactor temperature had reached 200° F., the steam was discontinued and water alone sprayed into the reactor until the bottom reactor temperature was reduced to about 100° F. By this technique, this reactor was cooled down 12–18 hours sooner than with the conventional technique previously used and the coke deposits on the reactor walls were removed more easily.

This invention should be understood to include all changes and modifications of the examples of the invention herein chosen for purposes of disclosure which do not constitute departures from the spirit and scope of the invention.

I claim:

In a high temperature conversion process for converting a hydrocarbon charge at a temperature above 650° F. employing a bed of solid contact material within an enclosed reactor of large cross-sectional area, the process for removing coke deposits from the reactor in a manner that minimizes shutdown time and facilitates removal of said deposits, which comprises: discontinuing the supply of hydrocarbon charge and solid contact material to said reactor; removing substantially all solid contact material from said reactor; spraying steam into said reactor until the temperature in the reactor is reduced to a temperature within the range about 600 to 650° F.; after said reduction in temperature, spraying a mixture of liquid water and steam into said reactor and cooling said reactor thereby to a temperature within the range about 150 to 250° F. and adjusting the quantity of said mixture and the ratio of liquid water to steam in the mixture to effect said cooling at a rate within the range 40 to 60° F. per hour; after said cooling to a temperature within the range about 150 to 250° F., spraying liquid water alone into said reactor to cool said reactor to a temperature within the range 75 to 100° F.; mechanically removing coke from the metal parts of said reactor and removing loose coke from the reactor; refilling the reactor with solid contact material and reintroducing hydrocarbon charge and continuing the conversion of said charge as before said shutdown.

References Cited in the file of this patent

UNITED STATES PATENTS

| | | |
|---|---|---|
| 1,174,888 | Mooney | Mar. 7, 1916 |
| 2,057,441 | McAllister | Oct. 13, 1936 |
| 2,076,847 | Johnston | Apr. 13, 1937 |
| 2,289,351 | Dixon | July 14, 1942 |
| 2,671,741 | Duvall | Mar. 9, 1954 |